W. H. CURTIS.
COMBINATION DEEP WATER VESSEL CARRYING BARGE.
APPLICATION FILED JUNE 6, 1911.
1,025,514.
Patented May 7, 1912.
4 SHEETS—SHEET 3.
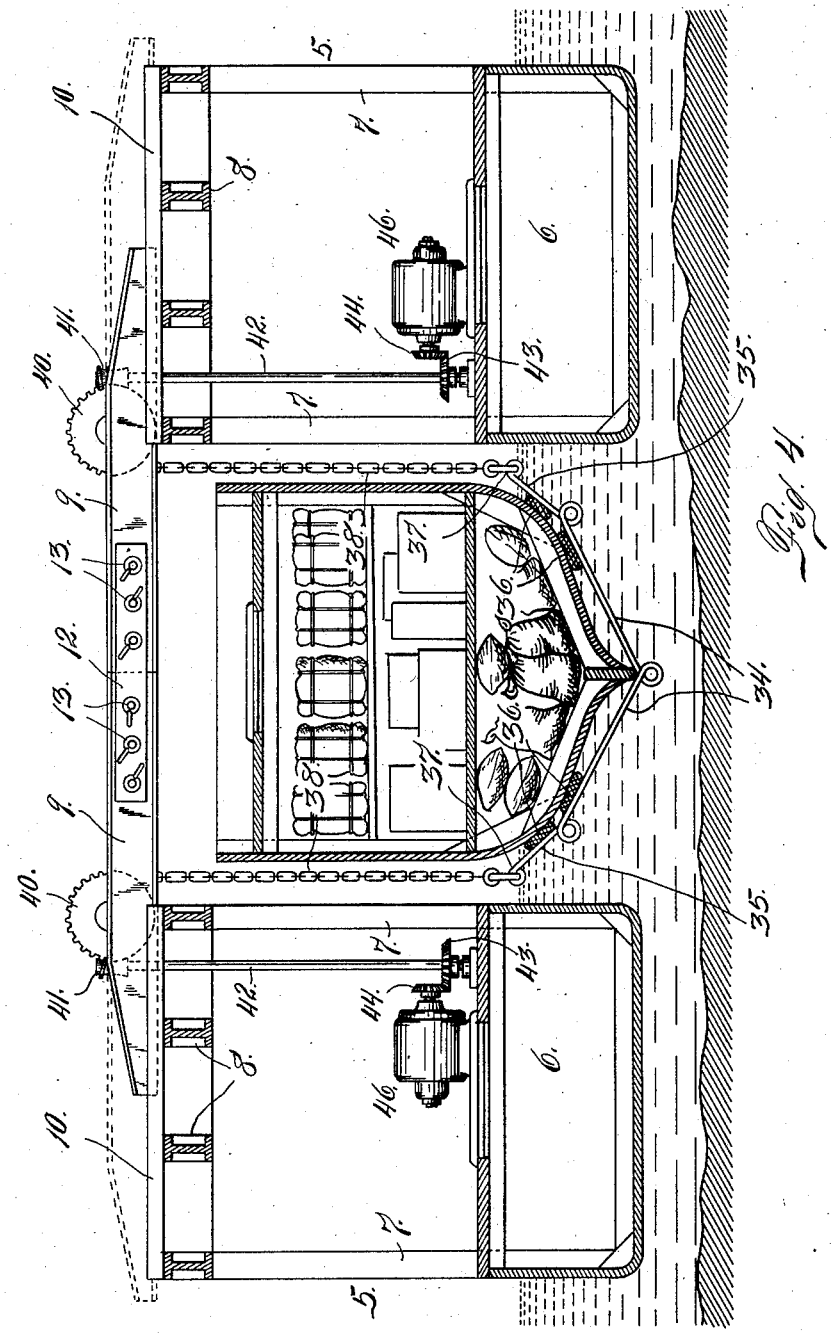

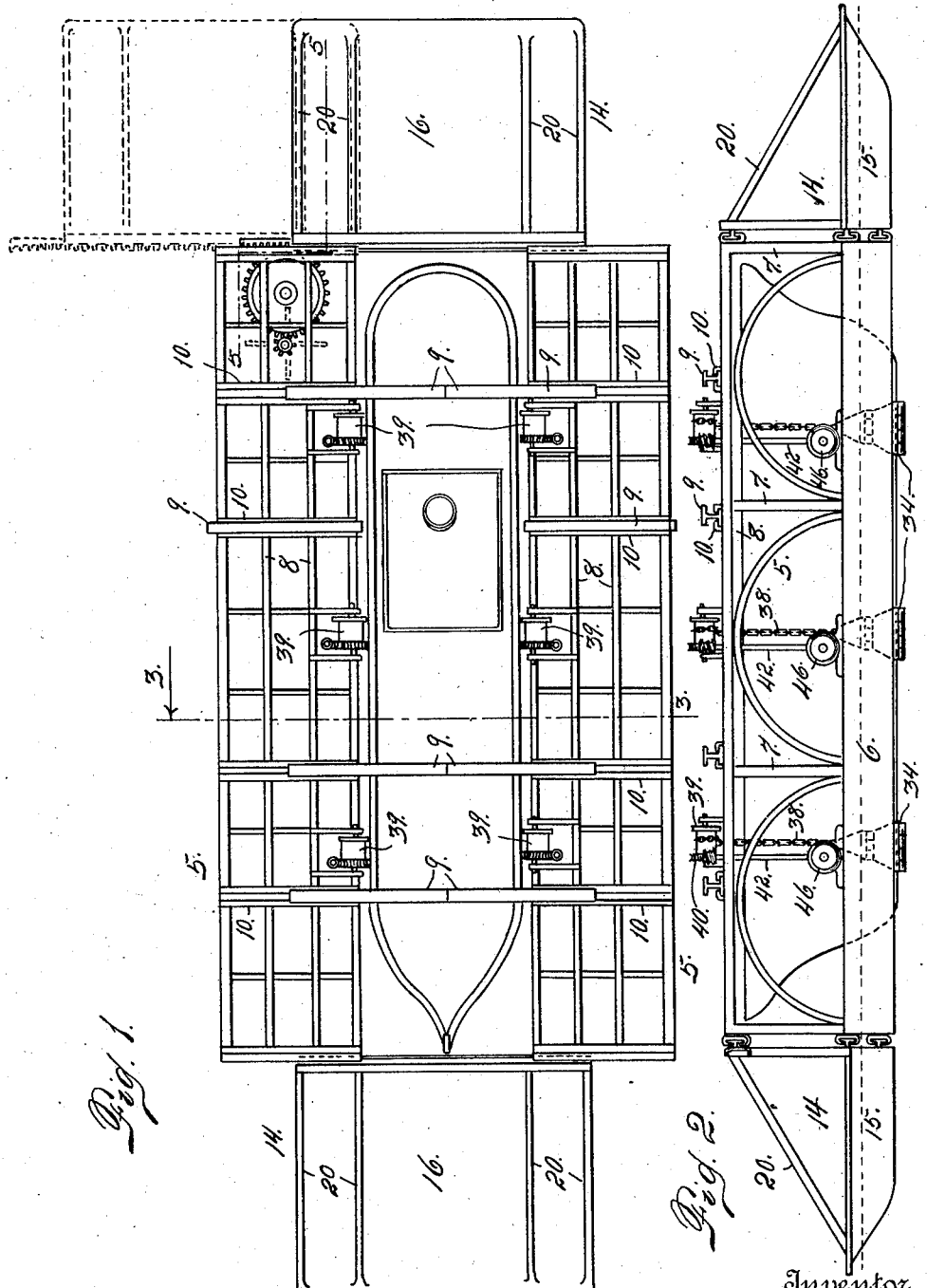

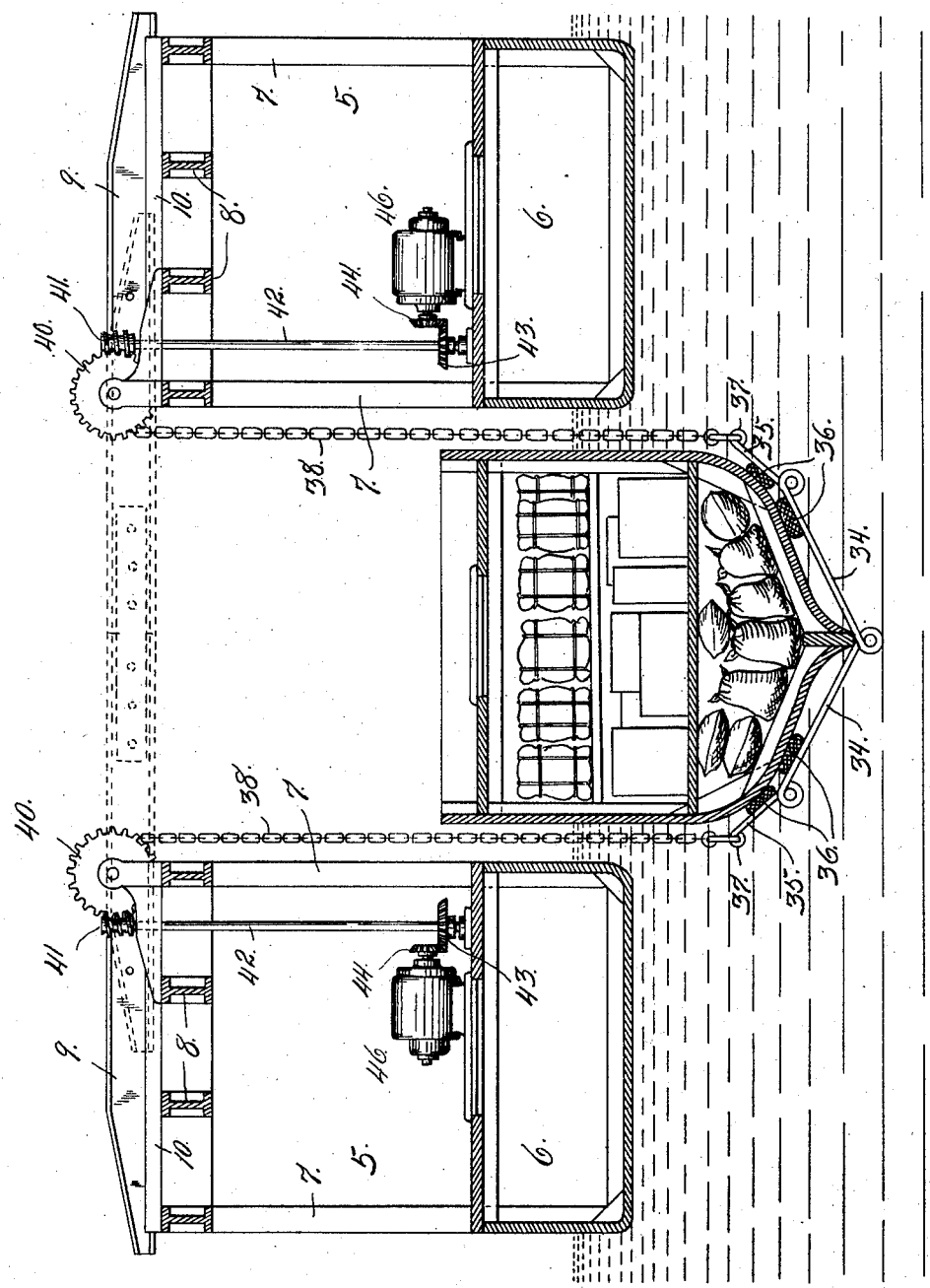

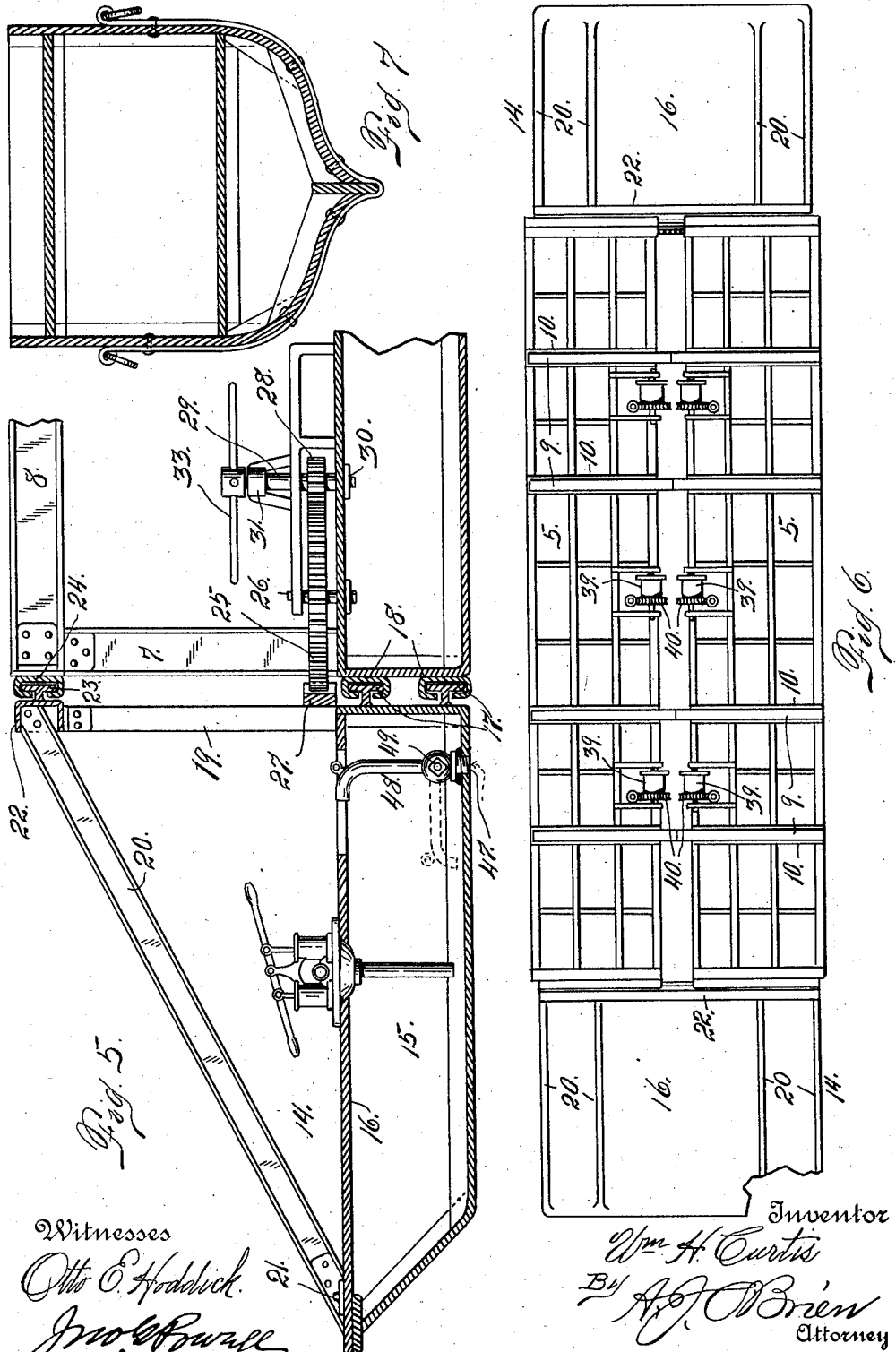

UNITED STATES PATENT OFFICE.

WILLIAM H. CURTIS, OF DENVER, COLORADO.

COMBINATION DEEP-WATER-VESSEL-CARRYING BARGE.

1,025,514.  Specification of Letters Patent.  Patented May 7, 1912.

Application filed June 6, 1911. Serial No. 631,593.

*To all whom it may concern:*

Be it known that I, WILLIAM H. CURTIS, a citizen of the United States, residing in the city and county of Denver and State of Colorado, have invented certain new and useful Improvements in Combination Deep-Water-Vessel-Carrying Barges; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a barge or floating structure of such buoyancy that a deep-water vessel can be raised and supported thereby in comparatively shallow water, thus making it practicable for vessels, which ordinarily require deep water for their use, to be used in comparatively shallow water.

By virtue of this construction and arrangement, rivers, which, under ordinary circumstances, are not navigable for deep-water vessels may be made navigable for such vessels, thus greatly lessening the expense of carrying freight from the sea-border to inland cities, since the necessity for unloading the freight from deep-water vessels and loading it on smaller vessels is obviated.

My improved construction consists of two barge members, which, when employed in connection with a vessel, are separated to allow the vessel to pass between them, the barge members being connected at their extremities, one of the end connections being transversely movable to allow the vessel to enter and adapted afterward to be closed, whereby the vessel is completely surrounded. Provision is made for connecting chains or cables with the vessel, the said chains being connected with hoisting apparatus mounted upon the barge members. The barge members, as they are not loaded, have such buoyancy that the loaded vessel may be raised to float in comparatively shallow water, without depressing the barge beyond a shallow depth, thus making the entire structure floatable in water comparatively shallow, and such as may be found in inland rivers of ordinary size.

Having briefly outlined my improved construction, I will proceed to describe the same in detail, reference being made to the accompanying drawing, in which is illustrated an embodiment thereof.

In this drawing: Figure 1 is a top plan view of my improved deep-water vessel carrying-barge, the vessel being shown in place. Fig. 2 is a side elevation of the same. Fig. 3 is a cross section of the structure shown in Figs. 1 and 2, but on a larger scale. This section may be indicated by the line 3—3 of Fig. 1. Fig. 4 is a similar view, showing the vessel raised between the two barge members. Fig. 5 is a section, taken on the line 5—5 of Fig. 1, looking in the direction of the arrow, the parts being shown on a greatly enlarged scale. Fig. 6 is a top plan view of the structure, showing the two barge members brought close together, where the apparatus is employed as a barge only or for freight-carrying purposes. Fig. 7 is a cross section of the hull of a vessel, showing the modified form of equipment with which the chains or cables used for raising the vessel may be connected.

The same reference characters indicate the same parts in all the views.

Let the numeral 5 designate each of two barge members considered in its entirety. The lower portion of each of these members consists of an air chamber 6, while the superstructure is composed of upright posts 7 upon which are mounted longitudinally-disposed I-beams 8, the two members being connected at the top by transversely-arranged I-beams 9, which are slidable in ways 10 formed on the barge members. These beams 9 are suitably connected intermediate the barge members by means of overlapping plates 12 and bolts 13, so that the beams may be disconnected and slid outwardly on the barge members, as indicated by dotted lines in Fig. 4. By virtue of this arrangement, the barge members may be separated at will and still connected at the top by the beams 9, whereby the two members are held securely interlocked at the top. The lower portions of the two barge members are connected at their extremities by end members 14, which are slidably-arranged upon the ends of the barge members. As shown in the drawing, each end member 14 is provided with an air chamber 15 below a deck 16. The extremity of the lower part of each end member is provided with tongues 17 which are slidable in ways 18 formed on the barge members. The end members 14 are provided adjacent the barge members with posts 19, whose upper extremities are connected with inclined beams 20, the opposite extremities of the latter being connected with the deck, as shown at 21. The upper extremities of the posts 19 are connected by transversely-arranged channel bars 22, which are provided with tongues 23 engaging a grooved member 24. By virtue of this construction and arrangement, the end members are slidably connected with the barge members, whereby the structure may be opened at either end for the entrance of a vessel. It is not necessary to employ an apparatus for sliding both end members, since it is only necessary to open the structure at one end for the entrance of the vessel; hence, in the drawing, only one apparatus is illustrated for shifting an end member. This structure consists of a relatively large gear 25, journaled, as shown at 26, on the deck of one of the barge members, the said gear engaging a cogged rack 27 carried by the end member to be shifted. This large gear 25 meshes with a pinion 28 mounted on a vertically-disposed shaft 29, journaled at one extremity in the deck of the barge member, as shown at 30, and at its opposite extremity in a bearing 31 supported above the deck. The upper extremity of the shaft 19 is equipped with hand spikes 33, or other suitable devices, whereby it becomes practicable to manually operate the end member shifting apparatus. It is, of course, practicable to employ other power for this purpose, if it should be preferred to do so.

As illustrated in the drawing, I employ suitable means adapted to be passed under the hull of the vessel for raising the latter. As shown in Figs. 3 and 4, this apparatus consists of a number of links 34 and 35, jointed to allow the apparatus to conform as nearly as may be to the general shape of the bottom of the hull, suitable cushions 36 being interposed between the links and the bottom of the vessel to prevent injury to the latter during the raising operation. The links 35, which extend beyond the sides of the vessel hull, are connected as shown at 37 with hoisting chains 38, whose upper extremities pass over drums 39 provided with worm-wheels 40 engaging worms 41 formed on the upper extremities of vertically-disposed shafts 42, the lower extremity of each shaft having a gear 43 meshing with a similar gear 44 fast on the armature shaft of a motor 46. Any desired number of these hoisting elements may be employed, depending upon the length of the vessel. As shown in the drawing,—(see Figs. 1, 2 and 6), three of these hoisting elements are employed. After the linked structure is passed under the hull of the vessel and the chains connected therewith and with the hoisting drums, it is only necessary to start the motors in order to raise the vessel to the desired height necessary to allow it to move in the depth of water available for the purpose.

The hoisting apparatus, in actual practice, should be put in place below the hull of the vessel before the latter is moved into position between the two barge members, the linked structure, which is to engage the bottom of the hull, being let down to a sufficient depth as not to interfere with the entrance of the vessel into the space between the barge members. After the vessel is in place, the chains may be wound upon the drums to bring the linked structure into engagement with the bottom of the hull for vessel lifting purposes.

In the form of construction shown in Fig. 7, the hull of the vessel is equipped with apparatus with which the hoisting chains 38 are connected. This is practicable, where it is contemplated at the time of the building of the vessel, to employ it in connection with my improved vessel-carrying barge. The apparatus illustrated in the other figures, however, is practicable with vessels already constructed.

In the event that the end members 14 should not, owing to their jointed connection with the barge members, move downwardly in exact horizontal relation with the barge members during the lifting of the vessel to be raised, these end members may be ballasted with water, which may be allowed to enter through a bottom opening 47 into which is screwed a nozzle 48, which is jointed, as shown at 49. When it is not desired to allow the water to enter the chamber 15 of the end member, this nozzle 48 occupies an upright position, and is of such length as to prevent the water from entering. When, however, it is desired to allow the water to leak into the chamber 15, the upwardly-projecting part of the nozzle 48 is turned downwardly to the dotted line position in Fig. 5, in which event the water may enter the chamber 15 through the said nozzle member, as indicated by the dotted arrow in Fig. 5. In this way, the end members may be ballasted to any extent desired.

From the foregoing description, it will be understood that, in order to employ my improved structure in connection with a vessel, it is only necessary to move one of the said members laterally to the position shown by dotted lines in Fig. 1, after which the vessel may be moved into position between the barge members 5. After this is done, the shifted end member is returned to its normal position, and it is only necessary to start the motors 46 in order to bring the hoisting apparatus into operative relation with the hull of the vessel, whereby the latter may be raised until the lowest part of its bottom lies in the same plane with the bottoms of the barge members.

It is evident that my improved structure may be used alone as a barge by bringing the two members closely together, as indicated in Fig. 6, and, when so arranged, it may be employed for carrying freight in the usual way.

Having thus described my invention, what I claim is:

1. A barge composed of two side members suitably spaced for the entrance of the hull of a vessel, the two side members being relatively buoyant, whereby they may be employed for raising a vessel to cause the latter to move in comparatively shallow water, and buoyant end members with which the side members are adjustably connected, the side members being equipped with hoisting apparatus, substantially as described.

2. A barge composed of side members adapted to be spaced apart for the entrance of the hull of a vessel, the said side members being relatively buoyant, whereby they may be employed for raising a vessel to cause the latter to move in comparative shallow water, buoyant end members with which the side members are adjustably connected, and means mounted upon one of the side members and in operative relation with one of the end members for disconnecting the said end member from the opposite side member, to permit a vessel to enter between the two side members, for the purpose set forth.

3. A barge composed of two buoyant side members adapted to be spaced apart for the entrance of the hull of a vessel, whereby they may be employed for raising a loaded vessel to cause the latter to move in comparatively shallow water, buoyant end members connecting the said side members, the end members being slidable upon the said side members, and means mounted upon the barge for hoisting purposes, substantially as described.

4. A barge composed of buoyant side members adapted to be spaced for the entrance of the hull of a vessel, the opposite extremities of the said side members being equipped with ways, end members adjustably mounted in the said ways and connecting the two side members, and means mounted upon one of the side members and in operative relation with one of the end members for disconnecting the said end member from one of the side members, to permit the entrance of the hull of a vessel between the said side members, the barge being equipped with vessel hoisting apparatus, substantially as described.

5. A barge composed of two buoyant side members, buoyant end members connecting the said side members, the opposite extremities of the side members being equipped with ways in which the said end members are slidably mounted, one of the said end members being equipped with a rack and one of the side members being provided with a gear in operative relation with the said rack, whereby when the gear is operated the said end member is caused to slide in the ways of the side members out of engagement with one of the side members to permit the entrance of the hull of a vessel between the two side members, and hoisting means mounted upon the barge, substantially as described.

In testimony whereof I affix my signature in presence of two witnesses.

WILLIAM H. CURTIS.

Witnesses:
F. ALLAN McGUIRE,
GEO. BROWN.

---

Copies of this patent may be obtained for five cents each, by addressing the "Commissioner of Patents, Washington, D. C."